(12) United States Patent
Thiele et al.

(10) Patent No.: US 11,848,579 B2
(45) Date of Patent: Dec. 19, 2023

(54) COMPACT POWER TOOL DATA LOGGER

(71) Applicant: MILWAUKEE ELECTRIC TOOL CORPORATION, Brookfield, WI (US)

(72) Inventors: John W. Thiele, Belgium, WI (US); Richard A. Zainer, Hubertus, WI (US); Matthew Post, Milwaukee, WI (US); Gareth Mueckl, Milwaukee, WI (US); Jonathan E. Abbott, Milwaukee, WI (US); Matthew N. Thurin, Wausatosa, WI (US); Kellen Carey, Portland, OR (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 768 days.

(21) Appl. No.: 16/739,304

(22) Filed: Jan. 10, 2020

(65) Prior Publication Data
US 2020/0227927 A1    Jul. 16, 2020

Related U.S. Application Data

(60) Provisional application No. 62/791,274, filed on Jan. 11, 2019.

(51) Int. Cl.
*H02J 7/00* (2006.01)
*B25F 5/02* (2006.01)
(Continued)

(52) U.S. Cl.
CPC ............ *H02J 7/00032* (2020.01); *B25F 5/02* (2013.01); *G06F 1/12* (2013.01); *H02J 7/0048* (2020.01); *H04W 4/029* (2018.02)

(58) Field of Classification Search
CPC .. H02J 7/00032; H02J 7/0048; H02J 2310/22; B25F 5/02; B25F 5/00; G06F 1/12; H04W 4/029; H04W 4/80
See application file for complete search history.

(56) References Cited

U.S. PATENT DOCUMENTS 6,502,949 B1 * 1/2003 Horiyama .......... B23Q 17/2404
                                                362/198
9,189,663 B2   11/2015 Goren et al.
(Continued)

FOREIGN PATENT DOCUMENTS

JP      2001300867 A    10/2001
WO      2007058596 A1    5/2007
WO      2017133991 A1    8/2017

OTHER PUBLICATIONS

International Search Report and Written Opinion for Application No. PCT/US2020/013017 dated May 7, 2020 (17 pages).
(Continued)

*Primary Examiner* — Zhipeng Wang
(74) *Attorney, Agent, or Firm* — Michael Best & Friedrich LLP

(57) ABSTRACT

A data logger device for a power tool including a housing, a power tool interface provided at the top of the housing and configured to be received in a corresponding interface of the power tool, and a battery pack interface provided at the bottom of the housing and configured to receive a corresponding interface of a battery pack providing operating power to the power tool. The data logger also includes a tool terminal block, a battery terminal block provided, and bus bars connecting the tool terminal block to the battery terminal block to provide pass through power from the battery pack to the power tool. The data logger is configured to obtain data related to power tool operation, and export, using a transceiver, the data to a user device.

13 Claims, 11 Drawing Sheets

(51) Int. Cl.
  *H04W 4/029* (2018.01)
  *G06F 1/12* (2006.01)

(56) References Cited

U.S. PATENT DOCUMENTS

| | | |
|---|---|---|
| 9,467,862 B2 | 10/2016 | Zeiler et al. |
| 9,672,708 B2 | 6/2017 | Goren et al. |
| 9,819,132 B2 | 11/2017 | Peloquin et al. |
| 10,131,042 B2 | 11/2018 | Mergener et al. |
| 2007/0295522 A1* | 12/2007 | Bohne .................... B25D 17/24 173/162.2 |
| 2008/0099224 A1 | 5/2008 | Hofmann et al. |
| 2008/0135272 A1* | 6/2008 | Wallgren ............ H01M 50/247 173/217 |
| 2010/0096151 A1 | 4/2010 | Ostling |
| 2012/0298392 A1* | 11/2012 | Weiss ........................ F16F 7/10 173/162.1 |
| 2013/0109375 A1 | 5/2013 | Zeiler et al. |
| 2014/0107853 A1 | 4/2014 | Ashinghurst et al. |
| 2014/0159920 A1* | 6/2014 | Furui ..................... G08C 17/02 340/870.07 |
| 2015/0170848 A1* | 6/2015 | Kannan ................... H01H 3/20 200/43.17 |
| 2016/0311094 A1* | 10/2016 | Mergener .............. H02J 7/0024 |
| 2017/0222382 A1* | 8/2017 | Peloquin ................ H01R 27/02 |
| 2019/0027002 A1* | 1/2019 | Esenwein ............. H04W 4/021 |

OTHER PUBLICATIONS

Hilti, "Operating Instructions SI-AT-A22", Hilti Corporation, Aug. 27, 2018 (28 pages).

* cited by examiner

COMPACT POWER TOOL DATA LOGGER

CROSS-REFERENCE TO RELATED APPLICATIONS

This application claims priority to U.S. Provisional Patent Application No. 62/791,274 filed on Jan. 11, 2019, the entire contents of which are incorporated by reference herein.

FIELD OF THE INVENTION

This application relates to an adapter for power tool devices and particularly to a data logger adapter for power tool devices.

DETAILED DESCRIPTION OF THE INVENTION

Figure 1:
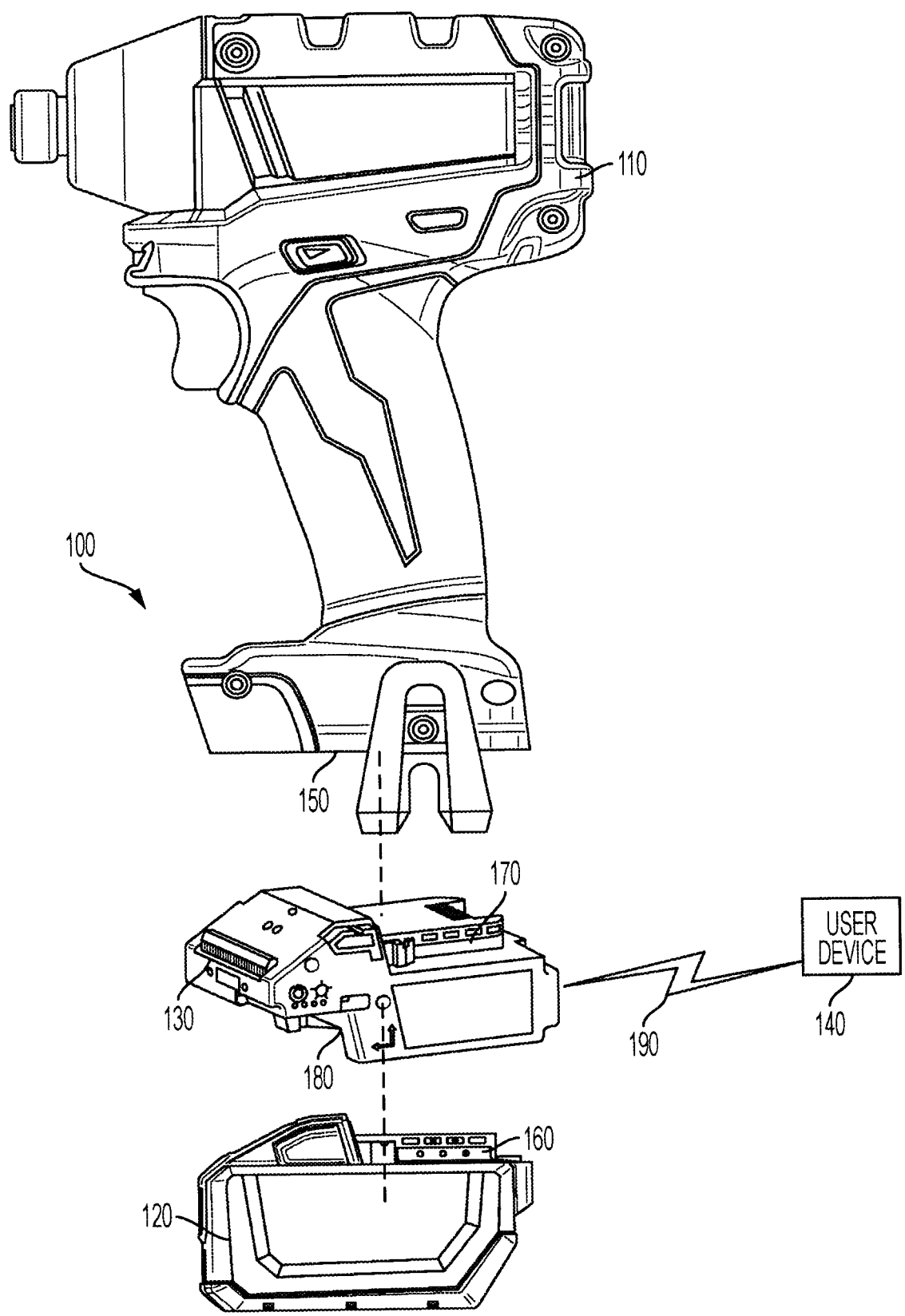
FIG. 1 illustrates a power tool data logging system in accordance with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Some organizations, for example, construction contractors and the like use power tool devices extensively. Operational information from power tools may be useful to the organizations for different analytic purposes. However, power tool devices may not communicate with external devices to provide operational information. Although some newer power tools may be designed that provide such information directly to a user device, organizations may need to replace their current fleet of power tool devices with a completely new fleet of power tool devices. This replacement may be not be feasible for the organization or in some cases, the reporting feature may not be provided on all tools. Additionally, current adapters available for power tools are not equipped to handle high amounts of current flow and add to the form factor of the power tool system. These adapters displace the center of gravity of the power tool system and thereby affect operation of the power tool.

Accordingly, there is a need for a compact data logger that records and provides power tool device use information to, for example, a user device and does not adversely affect the operation of the power tool. Embodiments disclosed are not limited to satisfying this need and also provide other benefits and advantages.

One embodiment provides a data logger for a power tool including a housing, a power tool interface provided at the top of the housing and configured to be received in a corresponding interface of the power tool, and a battery pack interface provided at the bottom of the housing and configured to receive a corresponding interface of a battery pack providing operating power to the power tool. The data logger also includes a tool terminal block provided below the power tool interface, a battery terminal block provided above the battery pack interface, bus bars connecting the tool terminal block to the battery terminal block. The data logger provides pass through power from the battery pack to the power tool via the bus bars for operation of the power tool when the data logger is coupled between the power tool and the battery pack. The data logger further includes a transceiver for communication between the data logger and a user device, and an electronic processor coupled to the transceiver. The electronic processor is configured to obtain data related to power tool operation, and export, using the transceiver, the data to the user device.

Another embodiment provides a device for use with a power tool including a housing, a power tool interface provided on the housing and configured to be received in a corresponding interface of the power tool, and a tool terminal block provided below the power tool interface. The device further includes a first finned bus bar including at least one fin and connecting a first terminal of the tool terminal block to a second terminal, the second terminal providing a connection to a plurality of battery cells. The first finned bus bar provides power from the plurality of battery cells to the power tool via the tool terminal block for operation of the power tool when the power tool interface is coupled to the power tool.

Another embodiment provides a data logger for a power tool including a housing, a power tool interface provided at the top of the housing and configured to be received in a corresponding interface of the power tool, and a battery pack interface provided at the bottom of the housing and configured to receive a corresponding interface of a battery pack providing operating power to the power tool. The data logger also includes a main printed circuit board (PCB) provided within the housing and a daughter printed circuit board (PCB) provided on top of the main PCB in a stacked configuration. The data logger further includes a transceiver provided on the daughter PCB for communication between the data logger and a user device, and an electronic processor provided on the main PCB and electrically coupled to the transceiver. The electronic processor is configured to obtain data related to power tool operation, and export, using the transceiver, the data to the user device.

Yet another embodiment provides a method for logging data using a data logger. The method including coupling a power tool interface of the data logger to a corresponding interface of a power tool and coupling a battery pack interface of data logger to a corresponding interface of a battery pack. A tool terminal block is provided below the power tool interface and a battery terminal block is provided below the battery pack interface. The method also includes providing, using bus bars electrically connecting the tool terminal block to the battery terminal block, power from the battery pack to the power tool for operation of the power tool when the data logger is coupled between the power tool and the battery pack. The method further includes obtaining, using an electronic processor of the data logger, data related to power tool operation, and exporting, using the electronic processor and a transceiver of the data logger, the data related to power tool operation to the user device.

Another embodiment provides a data logger for use with a power tool including a housing, a power tool interface provided on the housing and configured to be received in a corresponding interface of the power tool, and a battery pack interface provided on the housing and configured to receive a corresponding interface of a battery pack having the plurality of battery cells. The data logger further includes a tool terminal block provided with the power tool interface, a battery terminal block provided with the battery pack interface, and a first finned bus bar including at least one fin. The first finned bus bar connects a first terminal of the tool terminal block to a second terminal of the battery terminal block, and the data logger provides pass through power from the battery pack to the power tool via the first finned bus bar for operation of the power tool when the data logger is coupled between the power tool and the battery pack. The data logger further includes a transceiver for communication between the data logger and a user device, and an electronic processor coupled to the transceiver. The electronic processor is configured to obtain data related to power tool operation, and export, using the transceiver, the data to the user device.

Yet another embodiment provides a battery pack for powering a power tool. The battery pack includes a battery pack housing, a power tool interface provided on the battery pack housing and configured to be received in a corresponding interface of the power tool, and a tool terminal block provided with the power tool interface. The battery pack further includes a plurality of battery cells within the battery pack housing and a first finned bus bar including at least one fin. The first finned bus bar connects a first terminal of the tool terminal block to a second terminal connected to the plurality of battery cells. The first finned bus bar further provides power from the plurality of battery cells to the power tool via the tool terminal block for operation of the power tool when the power tool interface is coupled to the power tool.

FIG. 1 illustrates a power tool data logging system 100 in accordance with some embodiments. In the example illustrated, the power tool data logging system 100 includes a power tool 110, a battery pack 120, a data logger 130, and a user device 140. The data logging system 100 is used to log and analyze data received from the power tool 110, the battery pack 120, or both. The data logging system 100 may include more or fewer components than those illustrated in FIG. 1 and may perform functions other than those described herein.

The power tool 110 is any motorized or non-motorized power tool device, for example, a drill-driver, a hammer drill, a rotary hammer, a miter saw, a jigsaw, a work light, a work radio, a dust extractor, and the like. The battery pack 120 is any suitable battery pack used to power the power tool 110. The battery pack 120 includes, for example, one or more battery cells having a chemistry that is Lithium-ion (Li-ion), Nickel-Cadmium (Ni-Cad), or the like, and a battery microcontroller to control the charge and discharge of the cells. The battery pack 120 may have a nominal voltage of 12 V, 18 V, 21 V, and the like. In the example illustrated, the battery pack 120 has a nominal voltage of 18 V. The power tool 110 includes a first interface 150 (for example, a corresponding interface of the power tool) that couples to a second interface 160 of the battery pack 120 (for example, a corresponding interface of a battery pack). Particularly, the power tool 110 receives the second interface 160 of the battery pack 120 in the first interface 150 of the power tool 110.

The data logger 130 is an adapter that is coupled between the power tool 110 and the battery pack 120. The data logger 130 includes a third interface 170 (for example, a power tool interface) on a top surface of the data logger 130 and a fourth interface 180 (for example, a battery pack interface) on a bottom surface of the data logger 130. The third interface 170 is similar to the second interface 160 of the battery pack 120. The third interface 170 is received in the first interface 150 of the power tool 110 to couple the data logger 130 to the power tool 110. The fourth interface 180 is similar to the first interface 150 of the power tool 110. The fourth interface 180 receives the second interface 160 of the battery pack 120 to couple the data logger 130 to the battery pack 120. Accordingly, the data logger 130 is coupled between the power tool 110 and the battery pack 120 by coupling the first interface 150 to the third interface 170 and coupling the second interface 160 to the fourth interface 180.

The user device 140 is, for example, a desktop computer, a laptop computer, a tablet computer, a smart telephone, a personal digital assistant, a smart watch, and the like. The user device 140 communicates using a wired or wireless connection 190 with the data logger 130. The data logger 130 includes several sensors to sense, and generate sensed data indicative of, characteristics of the power tool 110 and battery pack 120, and the data logger 130 retrieves data from the power tool 110 and the battery pack 120 as further described below. The data logger 130 provides the sensed and retrieved data to the user device 140

Figure 2:
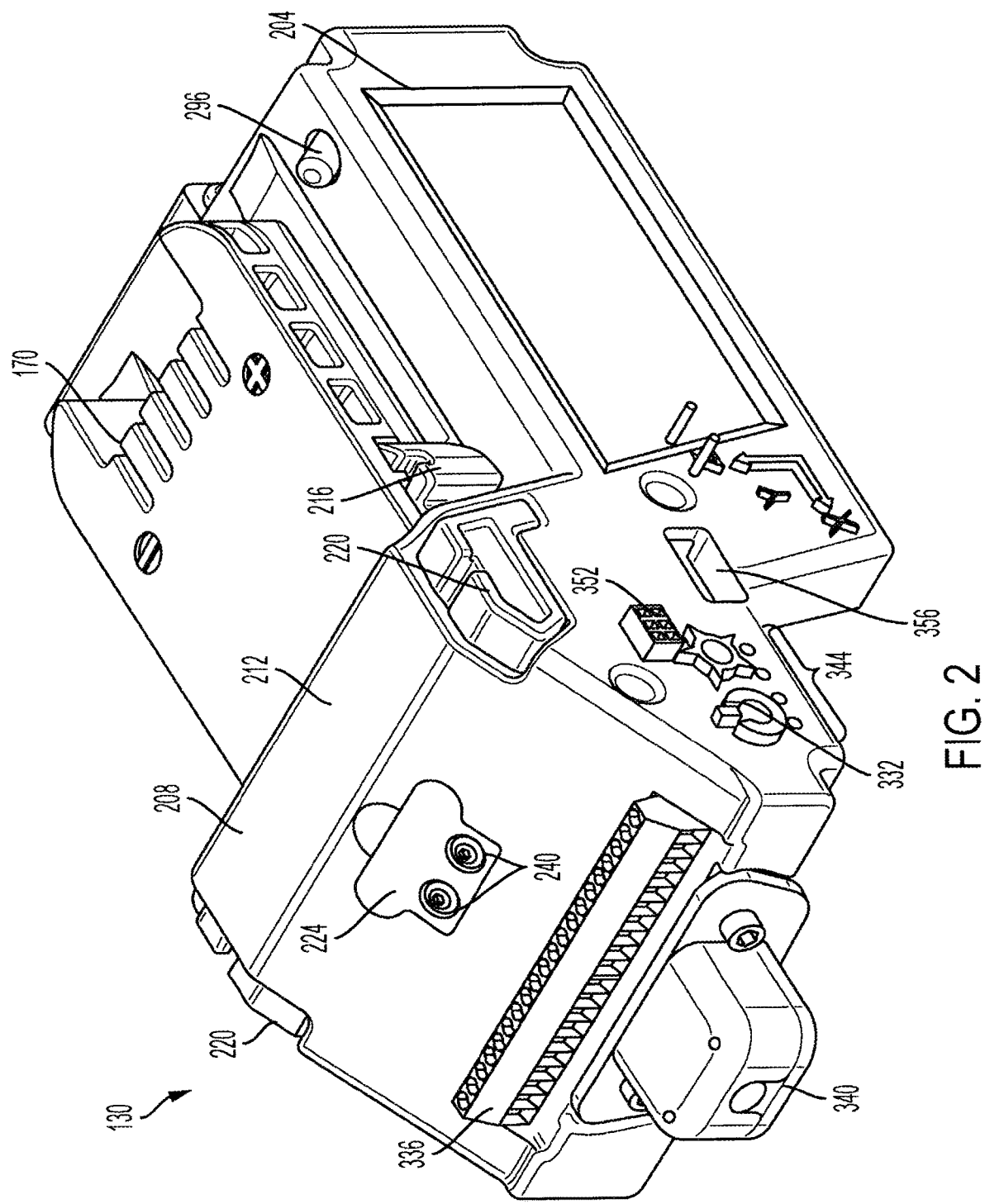
FIG. 2 is a front perspective view of a data logger of the power tool data logging system of FIG. 1 in accordance with some embodiments.
Figure 3:
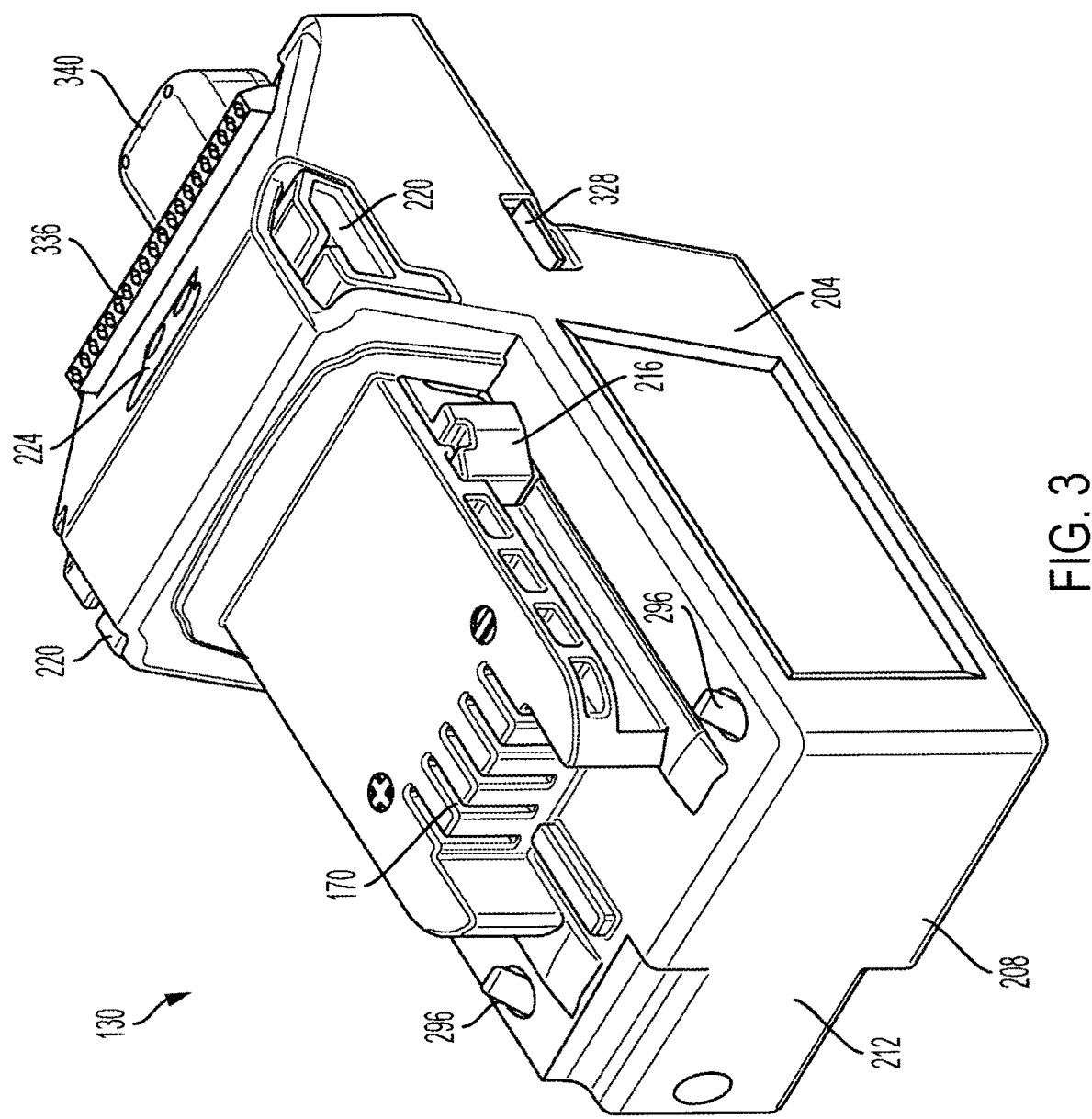
FIG. 3 is a rear perspective view of the data logger of FIG. 2 in accordance with some embodiments.
Figure 4:
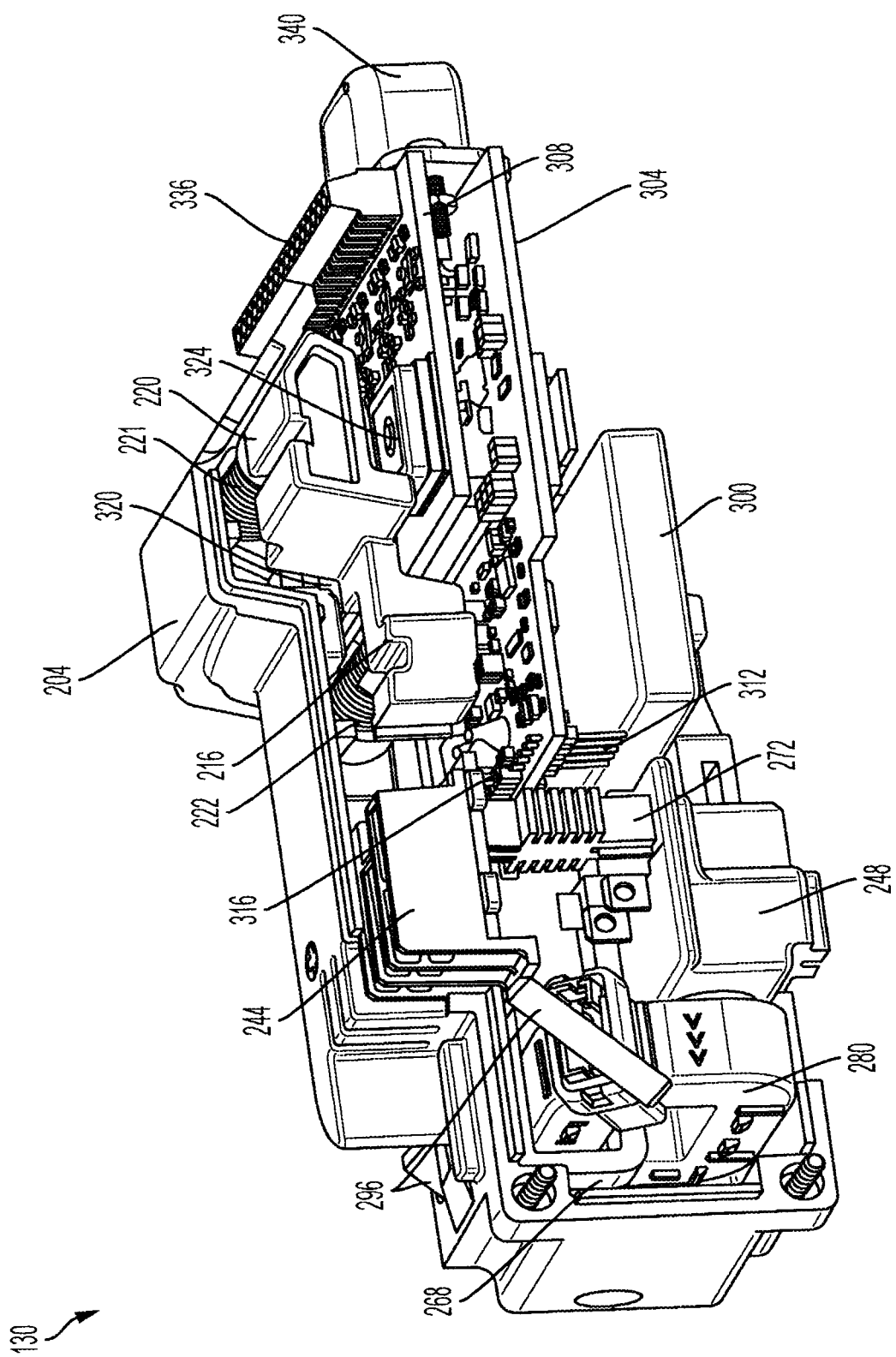
FIG. 4 illustrates the data logger of FIG. 2 with a side housing removed in accordance with some embodiments.

FIGS. 2-4 illustrate several views of the data logger 130. The data logger 130 includes a housing 204 made of a first half-housing 208 and a second half-housing 212. In the example illustrated, the first half-housing 208 and the second half-housings 212 are side-housings. In some embodiments, the first half-housing 208 and the second half-housing 212 are top and bottom half-housings of the data logger 130. In other embodiments, the housing 204 is integrally formed and may not include half-housings. Additionally, the first half-housing 208 and the second half-housing 212 may not be symmetrical and may include varying lengths, widths, and depths. The third interface 170 is provided on a top side of the housing 204 and the fourth interface is provided on a bottom side of the housing 204.

The data logger 130 includes a latch 216 provided on each of the left and right sides of the third interface 170. Each of the latches 216 engages a corresponding projection on the first interface 150 of the power tool 110 to prevent the data logger 130 from sliding off the power tool 110 when the data logger 130 is coupled to the power tool 110. The latches 216 are actuated by push buttons 220. The push buttons 220 are provided on a front side of the housing 204 to the front of the third interface 170. The push buttons 220 are integrally connected, respectively, to the latches 216 inside the housing 204 (as shown in FIG. 4) such that the latches 216 move inward when the respective push button 220 is pressed to release the data logger 130 from the power tool 110. As also illustrated in FIG. 4, the push buttons 220 and the latches 216 are spring-biased outward (see spring 221 located between the push buttons 220 and spring 222 between the latches 216).

Figure 5:
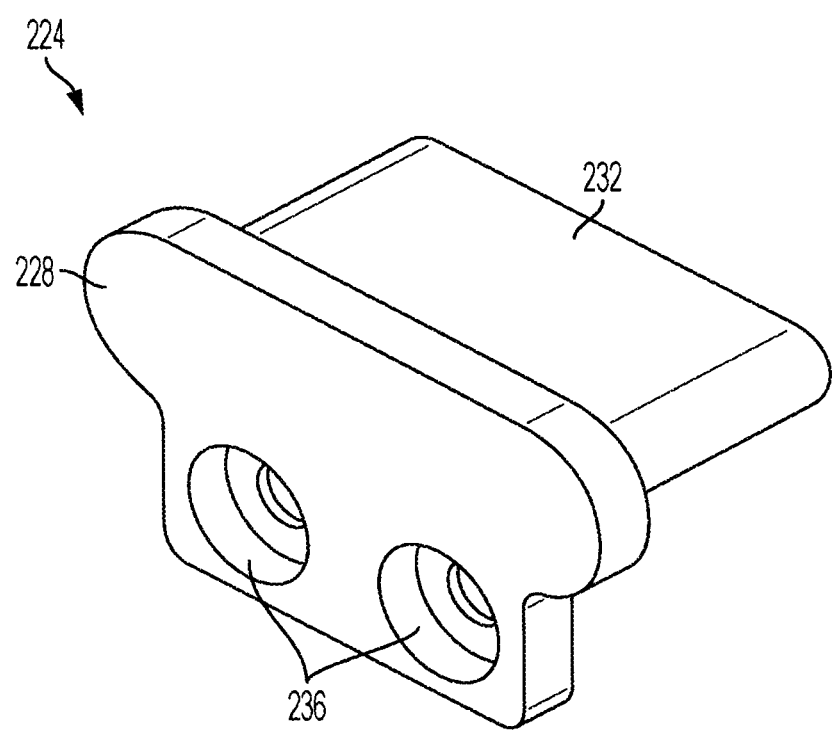
FIG. 5 illustrates a locking mechanism of the data logger of FIG. 2 in accordance with some embodiments.

The data logger 130 also includes a locking mechanism 224 provided on the front side of the housing 204. The locking mechanism 224 adds additional security to the data logger 130. Referring to FIG. 5, the locking mechanism 224 includes a front plate 228 and a blocking post 232 extending orthogonal to the front plate 228. The front plate 228 includes one or more screw holes 236. Referring to FIG. 2, fasteners 240 received in the screw holes 236 are used to fix the locking mechanism 224 onto the data logger 130. When the locking mechanism 224 is fixed to the data logger 130, the blocking post 232 extends between the push buttons 220 to prevent the push buttons 220 from being actuated (i.e., pressed inward). The locking mechanism 224 therefore prevents the data logger 130 from being decoupled from the power tool 110. The blocking post 232 is sized large enough to prevent depression of the push buttons 220 enough to disengage the latches 216 from the corresponding projections on the power tool 110, but small enough that the latches 216 (which are formed integrally with the push buttons 220) can be pushed inward when the data logger 130 is being coupled to the power tool 110 to enable the engagement of the data logger 130 to the power tool 110.

The fasteners 240 may be special type of fasteners that require special equipment to unscrew. For example, the fasteners 240 are torx™ screws that require a torx™ screw driver to unscrew. Because the locking mechanism 224 is secured via the fasteners 240, the locking mechanism 224 is selectively attached to the data logger 130. Thus, in some embodiments, the data logger 130 is provided without the locking mechanism 224 and the data logger 130 is coupled to the power tool 110 without the locking mechanism in place. In some embodiments, the locking mechanism 224 is also similarly provided to a latch mechanism of the battery pack 120 to lock the battery pack 120 to the data logger 130 and/or the power tool 110.

Figure 6:
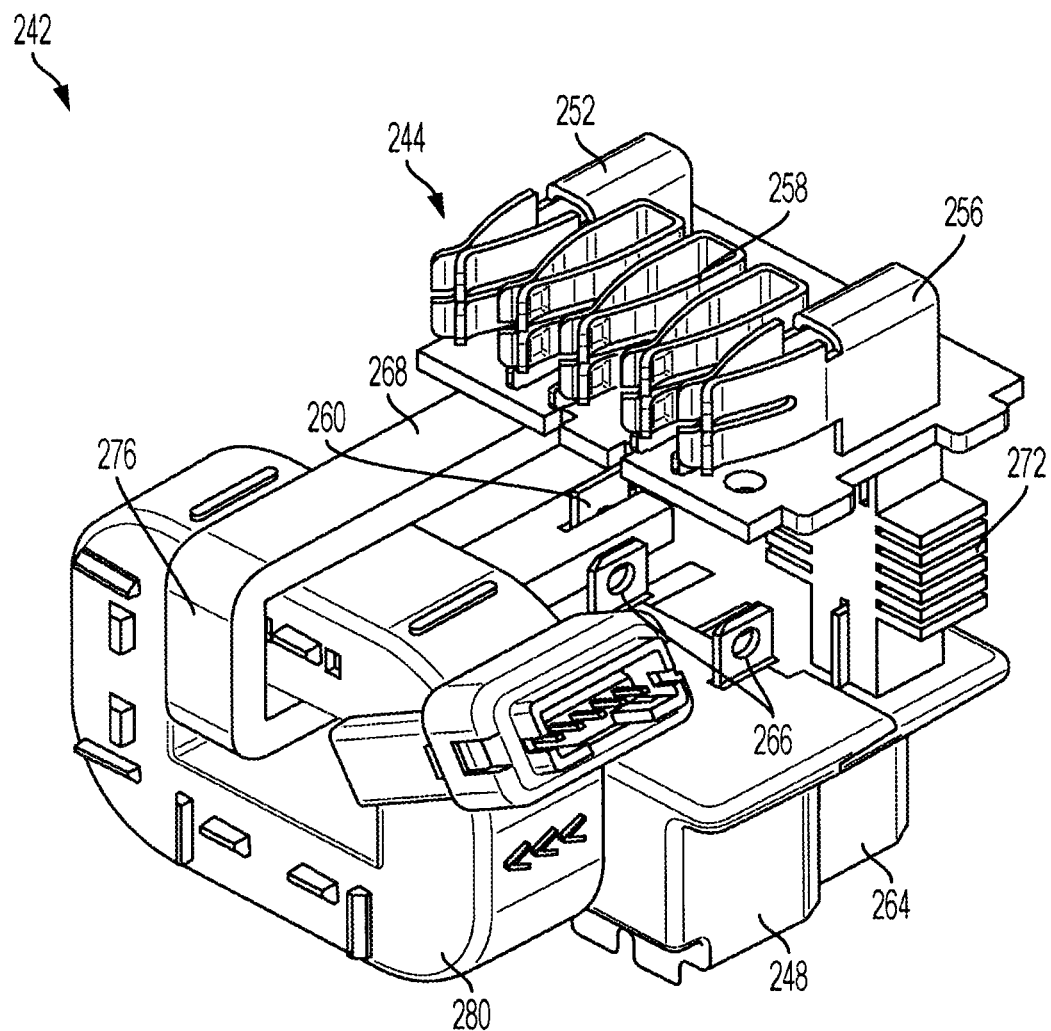
FIG. 6 illustrates a terminal block of the data logger of FIG. 2 in accordance with some embodiments.

Referring to FIGS. 4 and 6, a terminal block 242 of the data logger 130 includes a tool terminal 244 (for example, the tool terminal block) provided directly underneath the third interface 170 and battery terminal 248 (for example, the battery terminal block) provided directly above the fourth interface 180. Thus, the tool terminal 244 is linked to or corresponds with the third interface 170 and the battery terminal 248 is linked to or corresponds with the fourth interface 180. The tool terminal 244 includes a positive power terminal 252 and a negative power terminal 256 that receive a corresponding one of the positive and negative power terminals of the power tool 110. The tool terminal 244 also includes communication terminals 258 (for example, one or more tool communication terminals) that couple to the communication terminals of the power tool 110. Similarly, the battery terminal 248 includes a positive battery power terminal 260 and a negative battery power terminal 264 that are received in a corresponding one of the positive and negative power terminals of the battery pack 120. The battery terminal 248 also includes communication terminals 266 (for example, one or more pack communication terminals) that couple to the communication terminals of the battery pack 120.

The tool terminal 244 and the battery terminal 248 are electrically connected by a positive bus bar 268 and a negative bus bar 272 (for example, bus bars). Particularly, the positive bus bar 268 electrically connects the positive power terminal 252 to the positive battery power terminal 260 and the negative bus bar 272 electrically connects the negative power terminal 256 to the negative battery power terminal 264. When the data logger 130 is coupled between the power tool 110 and the battery pack 120, the data logger 130 provides pass through power from the battery pack 120 to the power tool 110 for operation of the power tool 110.

The battery pack 120 provides high amounts of current to the power tool 110. When the data logger 130 is providing pass-through current between the battery pack 120 and the power tool 110, the high amount of current being passed-through may produce heat in the data logger 130 that, if not handled or addressed through further design features, could otherwise damage the terminals or components of the data logger 130. Such problems are not encountered in pass-through adapters designed for low-current power tool devices.

Figure 7A:
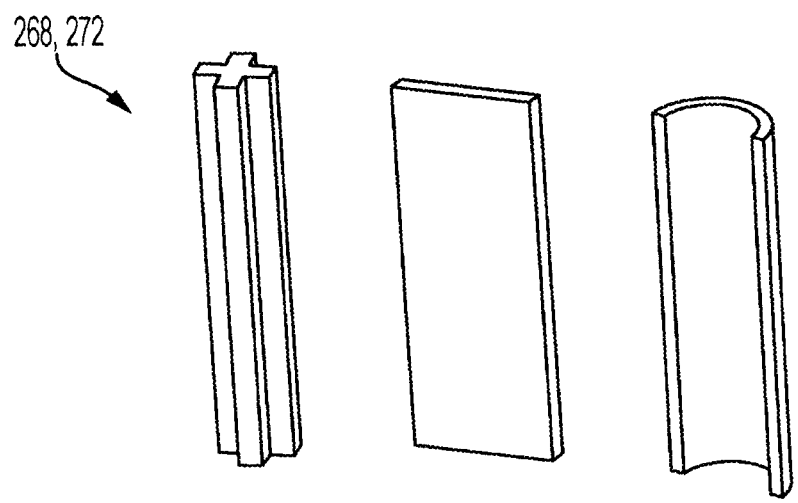
FIGS. 7A-C illustrate several designs of bus bars of the terminal block of FIG. 6 in accordance with some embodiments.
Figure 7B:
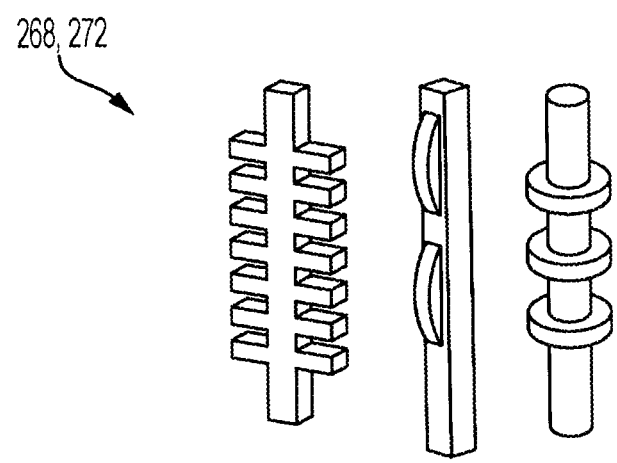
Figure 7C:
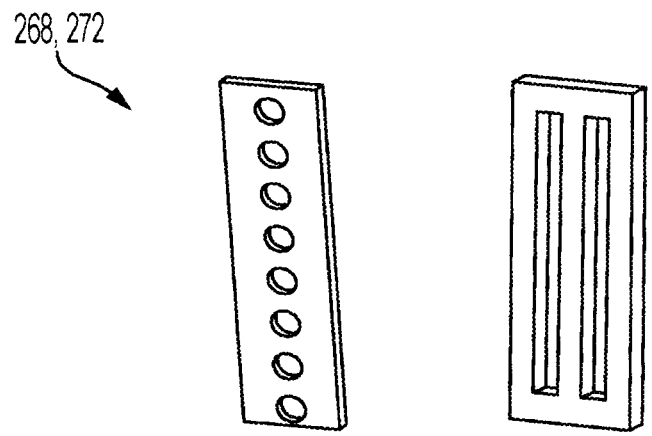

To reduce the amount of heat generated in the data logger 130, the positive bus bar 268 and the negative bus bar 272 are made with copper. The copper bus bars 268, 272 support high current loads without generating excess heat. Additionally, fins may be provided in the bus bars 268, 272 to provide heat sinking features to the bus bars 268, 272. FIGS. 7A-C illustrate the several alternative bus bar designs that may be utilized to provide heat sinking capabilities to the bus bars 268, 272. FIG. 7A illustrates bus bars 268, 272 having extruded fins, FIG. 7B illustrates bus bars 268, 272 including intermittent fins, and FIG. 7C illustrates bus bars 268, 272 with slots. The fins and slots in the bus bars 268, 272 increase the surface area of the bus bars 268, 272 to allow for better heat dissipation from the bus bars 268, 272. In some embodiments, the fins are soldered with silver solder to provide additional heat dissipation properties to the bus bars 268, 272. In some embodiments, a cross-section of the bus bars 268, 272 includes a width and a height such that the height is at least 20% of the width, at least 30% of the width, at least 50% of the width, between 20-50% of the width, between 30-40% of the width, and the like. The bus bars 268, 272 are different from other flat metal connectors and wire connectors. Particularly, the bus bars 268, 270 include an increased surface area and thickness compared to flat metal connectors and wire connectors.

Returning to FIG. 6, the negative bus bar 272 extends straight from the negative battery power terminal 264 to the negative power terminal 256. The positive bus bar 268 is c-shaped including a loop 276 that extends towards the rear of the data logger 130. A current sensor 280 is provided on the loop 276 of the positive bus bar 268. The current sensor 280 is, for example, an inductive sensor, a magnetic field current sensor, a shunt resistor and the like that detects the amount of current flowing between the power tool 110 and the battery pack 120 through the positive bus bar 268. In one example, the current sensor 280 is a shunt resistor implemented in parallel with at least one alternative path of known or calibrated resistance.

Referring to FIGS. 2 and 3, the data logger 130 also includes vibration screws 296 provided in the housing 204 of the data logger 130. Since the data logger 130 offsets the battery 120 by a certain distance, the data logger 130 may offset the center of gravity of the power tool system 100. This offset in the center of gravity may result in slop or additional rotational inertia of the power tool system 100. The vibration screws 296 provide compression between the power tool 110 and the data logger 130 that reduces the extra degree of freedom. Particularly, the compression provided by the vibration screws 296 dampens the vibrations caused due to the addition of the data logger 130 to the power tool system 100. The vibration screws 296 are provided diagonally through the housing 204 at a rear portion of the housing 204. At the top portion of the housing 204, the vibration screws 296 extend through openings in the housing 204 and contact the first interface 150 of the power tool 110 to dampen the vibrations from the power tool 110. Similar features may be provided on the under-side of the data logger 130 or in the battery pack 120 to reduce the vibrations between the data logger 130 and the battery pack 120. In some embodiments, rather than vibration screws 296 or in addition to vibration screws 296, other vibration dampening features, for example, overcenter cams, wedged rails, and the like may be used to dampen vibrations. In some embodiments, the vibration screws 286 may include metal inserts in plastic to support loadings and prevent stripping of the vibration screws 286.

FIG. 4 illustrates a physical layout of the components of the data logger 130. The data logger 130, in one example, is powered by an internal battery 300. The internal battery 300 is for example, a Lithium-Polymer battery. In some embodiments, the data logger 130 may not include an internal battery 300 and is powered by pass-through power from the battery pack 120. The data logger 130 includes a main printed circuit board (PCB) 304 hosting an electronic processor 360 (see FIG. 8) of the data logger 130. A daughter printed circuit board (PCB) 308 is provided over the main PCB 304. The daughter PCB 308 allows for the placement of additional electronic components of the data logger 130. Therefore, by stacking the daughter PCB 308 on top of the main PCB 304, component density of the data logger 130 is increased. The internal battery 300 is provided below the main PCB 304 and a battery connector 312 connects the internal battery 300 to the main PCB 304 to provide operating power from the internal battery 300 to the main PCB 304. A communication connector 316 is also provided between the terminal block 242 and the main PCB 304 to provide communication signals between the main PCB 304 and the communication terminals 258, 266.

The daughter PCB 308 includes a short-range transceiver chip 320 and a global positioning system (GPS) chip 324. The short-range transceiver chip 320 facilitates short-range wireless communication between the data logger 130 and the user device 140. The data logger 130 may use the GPS chip 324 to synchronize the internal cock to a GPS time and to determine real-time location data. By placing the terminal block 242 towards the rear of the housing 204 and the short-range transceiver chip 320 and the GPS chip 324 towards the front of the housing 204, interference caused by the power terminals 244, 248 and the bus bars 268, 272 on the short-range transceiver chip 320 and the GPS chip 324 can be reduced or avoided. In one example, a front of the housing 204 includes a portion of the data logger housing 204 corresponding to a side of the power tool receiving the tool bit. That is, the side of the power tool receiving the tool bit may be considered the front side of the power tool, and the corresponding portion of the data logger housing 204 provided by the front side of the power tool may be considered the front of the housing 204. In this example, a rear of the housing 204 includes a portion of the data logger housing 204 opposite the front of the housing 204. For example, the rear of the housing 204 may include the rear half or rear third of the housing 204, and the front of the housing 204 may include the front half or front third of the housing 204. A secure digital non-volatile memory card (SD card) input 328 is also provided below the main PCB 304 to receive an SD card 330.

The internal battery 300, the main PCB 304, and the daughter PCB 308 are assembled in a front portion of the housing 204 to the front of the terminal block 242. The latch 216 and the push buttons 220 are provided above the internal battery 300, the main PCB 304, and the daughter PCB 308. The internal components of the data logger 130 are arranged as described above to reduce the overall size of the housing 204. Particularly, the data logger 204 has a height of approximately 40 millimeters. In some embodiments, the data logger 204 has a height between 30 millimeters and 50 millimeters. In other words, the data logger 204 displaces the battery pack 120 from the power tool 110 by approximately 40 millimeters.

Referring to FIG. 2, the data logger 130 includes button inputs 332 (for example, a power button and an action button) provided on the outside of the housing 204. The data logger also includes thermocouple ports 336 and a communication and external sensor port 340 for wired communication with the user device 140. The communication and external sensor port 340 is, for example, a serial peripheral interface (SPI), universal asynchronous receiver/transmitter (UART), inter-integrated circuit (I2C) interface, power interface, and the like. Light emitting diodes (LEDs) 344 are also provided on the housing 204 to provide indications to a user regarding the status of the data logger 130. In some embodiments, a programming head 352 and/or a programming universal serial bus (USB) port 356 is also provided. A user may program the data logger 130 using one of the programming head 352 and/or the programming USB port 356.

Figure 8:
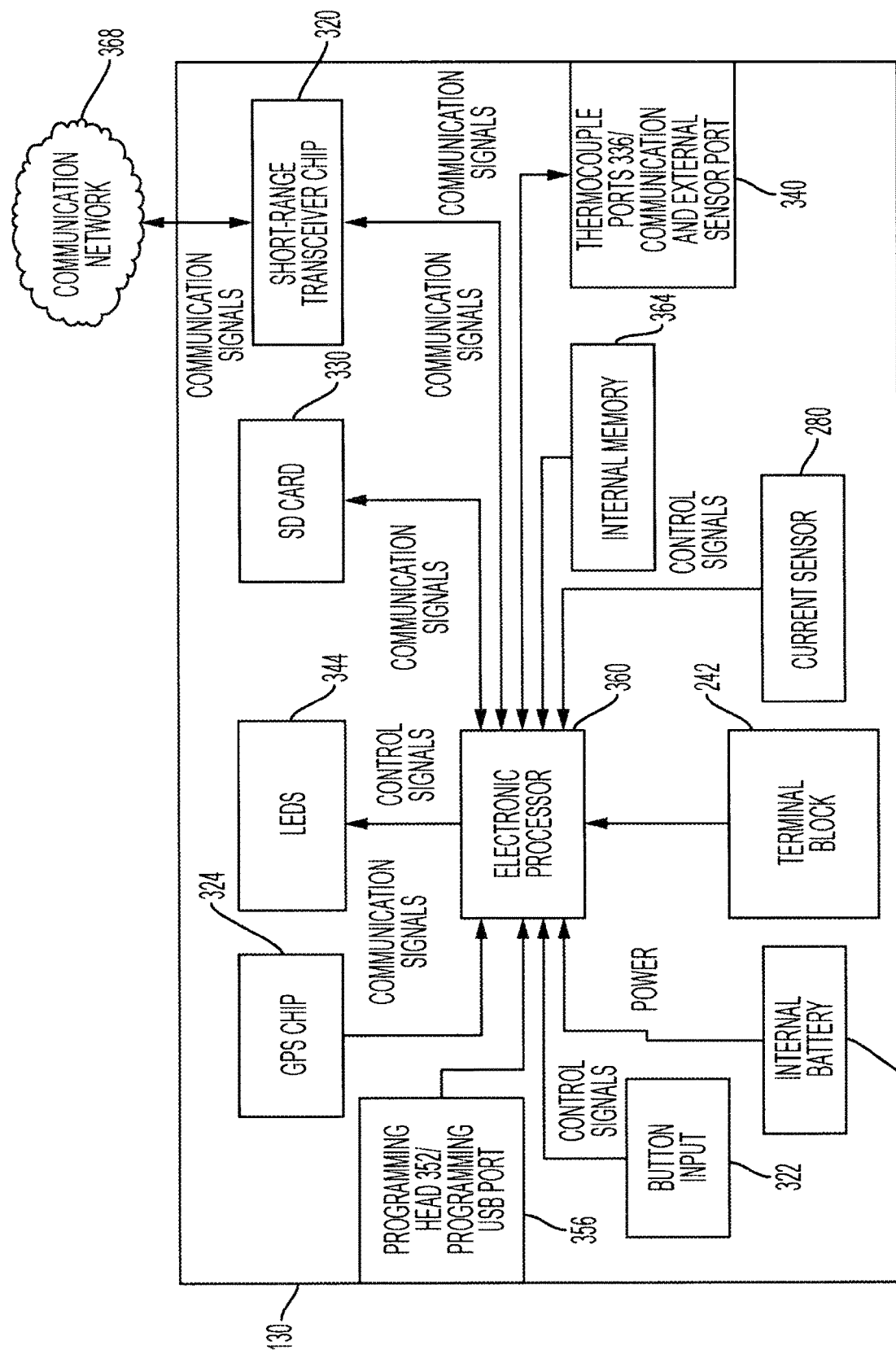
FIG. 8 is a simplified block diagram of the data logger of FIG. 2 in accordance with some embodiments.

FIG. 8 is a simplified block diagram of the data logger 130 in accordance with some embodiments. In some embodiments, the data logger 130 includes fewer or additional components than those shown in FIG. 8. The data logger 130 includes an electronic processor 360 and an internal memory 364. The internal memory 364 includes read only memory (ROM), random access memory (RAM), other non-transitory computer-readable media, or a combination thereof. The electronic processor 360 is configured to communicate with the memory 364 to store data and retrieve stored data. The electronic processor 360 is configured to receive instructions and data from the memory 364 and execute, among other things, the instructions. In particular, the electronic processor 360 executes instructions stored in the memory 364 to perform the methods described herein.

The data logger 130 may receive operating power from the internal battery 300 and/or the terminal block 242. In some embodiments, power from the terminal block 242 may be routed to the internal battery 300 to recharge the internal battery 300. The electronic processor 360 can retrieve data from the power tool 110 or the battery pack 120 over the terminal block 242 and particularly over the communication terminals 258, 266. The button input 322 may be used to power on the data logger 130 and to instruct the electronic processor 360 to gather sensor information. The button input 322 may also be used to instruct the electronic processor 360 to perform other actions. The electronic processor 360 may be programmed using the programming USB port 356 and the short-range transceiver chip 320 may be programmed using the programming head 352. A programming module may be connected to the programming head 352 or the programming USB port 356 to upload source code into the internal memory 364 through the electronic processor 360.

The short-range transceiver chip 320 allows for communication between the data logger 130 and the user device 140 over a communication network 368. In some embodiments, the short-range transceiver chip 320 may comprise separate transmitting and receiving components. The short-range transceiver chip 320 encodes information received from the electronic processor 360 into a carrier wireless signal and transmits the encoded wireless signal to the user device 140 over the communication network 368. The short-range transceiver chip 320 also decodes information from a wireless signal received from the user device 140 over the communication network 368 and provides the decoded information to the electronic processor 360.

The communication network 368 provides a direct or indirect wireless connection between the data logger 130 and the user device 140. The communication network 368 may comprise a short range network, for example, a Bluetooth® network, a Wi-Fi network or the like. In some embodiments, the data logger 130 may communicate with the user device 140 over a wired connection through one of the thermocouple ports 336 or the communication and external sensor port 340.

The data logger 130 may store the data retrieved from the power tool 110, the battery pack 120, and the various sensors of the data logger 130 in the SD card 330. The SD card 330 may then be transferred to the user device 140 to log the data on to the user device 140. In some embodiments, the SD card 330 may also store configuration parameters for the data logger 130. The data logger 130 operates (for example, collects sensor data) in accordance with the configuration parameters stored in the data logger 130.

The electronic processor 360 provides control signals to the LEDs 344 to indicate a status of the data logger 130. For example, the LEDs 344 may be controlled to indicate a power status (ON/OFF), a data status (for example, whether or not data acquisition is complete), and the like of the data logger 130.

Figure 9:
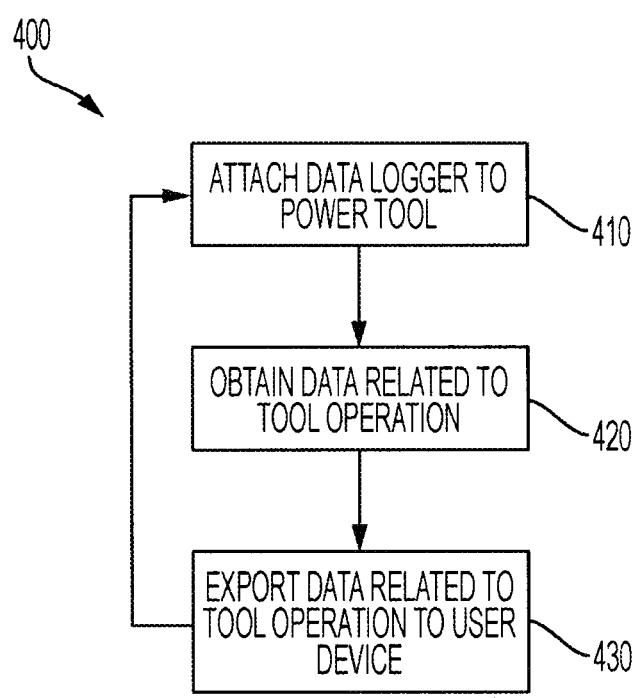
FIG. 9 is a flowchart of a method of logging data using the data logger of FIG. 2 in accordance with some embodiment.

FIG. 9 illustrates a method 400 of logging data using the data logger 130 in accordance with some embodiments. In the example illustrated, the method 400 includes attaching the data logger 130 to the power tool 110 (at block 410). The data logger 130 is attached to the power tool 110 by coupling the first interface 150 of the power tool to the third interface 170 of the data logger 130. The battery pack 120 is also attached to the data logger 130 to provide operating power to the power tool 110. The battery pack 120 is attached to the data logger by coupling the second interface 160 of the power tool to the fourth interface 180 of the data logger 130.

In some embodiments, in block 410, the locking mechanism 224 may be used to lock the data logger 130 to the power tool 110. As described above, the locking mechanism 224 prevents accidental decoupling of the data logger 130. The locking mechanism 224 also prevents theft of the data logger 130 or the power tool 110.

The method 400 also includes obtaining, using the electronic processor 360, the data related to tool operation (at block 420). As discussed above, the data logger 130 includes various sensors to obtain data from the power tool 110, the battery pack 120, and/or the environment in which the power tool 110 is being operated. In one embodiment, the data logger 130 obtains the current flowing to the power tool 110 from the battery pack 120. The data logger 130 uses the current sensor 280 to detect the current flowing to the power tool 110. The data logger 130 may also include a voltage sensor to detect the voltage of the battery pack 120. In some embodiments, the electronic processor 360 communicates with a voltage sensor of the battery pack 120, a voltage sensor of the power tool 110, a controller of the battery pack 120, or a controller of the power tool 110 to obtain the voltage of the battery pack 120. The data logger 130 may take continuous measurements of the current and voltage and store the data in the internal memory 364 or the SD card 330. In some embodiments, the data logger 130 may take discrete measurements at regular intervals, for example, every 2 milliseconds, and store the data in the internal memory 364 or the SD card 330.

In some embodiments, the data logger 130 includes a temperature sensor to detect a temperature of the power tool 110 or the battery pack 120 during operation of the power tool 110. In some embodiments, the electronic processor 360 may communicate with temperature sensors or controller of the power tool 110 or battery pack 120 to obtain temperature measurements of the power tool 110 or battery pack 120 during operation of the power tool 110.

In some embodiments, the data logger 130 includes motion sensor, for example, a nine-axis motion sensor to detect movement and orientation of the power tool 110. The data logger 130 records the motion sensor measurements during operation of the power tool 110. In some embodiments, the data logger 130 uses the GPS chip 324 to detect the current time and location of the power tool 110 during operation of the power tool.

In some embodiments, the data logger 130 may have one or more additional ambient sensors, for example, an ambient temperature sensor, an ambient light sensor, a vibration sensor and the like to detect ambient conditions of the power tool 110. The data logger 130 may record the ambient conditions even when the power tool 110 is not being operated.

The terminal block 242 of the data logger 130 provides pass-through power for operation of the power tool 110 when the data logger is coupled to the power tool 110 and the battery pack 120. The terminal block 242 includes heat management features as discussed above that prevent excess heat being generated in the data logger 130 during operation of the power tool 110.

The vibration screws 296 prevent excess vibrations from being generated during operation of the power tool 110 and prevent the vibration from affecting sensor readings of the data logger 130.

Returning to FIG. 9, the method 400 further includes exporting, using the electronic processor 360, data related to tool operation to the user device 140. The data related to tool operation recorded by the various sensors described above are exported to the user device 140 through a wired or wireless connection. In some embodiments, the data is exported over the communication network 368. In some embodiments, the data is exported through a wired connection over the thermocouple ports 336 or the communication and external sensor port 340. In other embodiments, a live serial output is provided to export sensed data in real time to the user device 140. In yet other embodiments, the sensed data may be stored in the SD card 330 and exported to the user device 140 when a user places the SD card 330 in the user device 140. In some embodiments, the data logger 130 may directly upload the data related to operation to a server rather than the user device 140.

Figure 10:
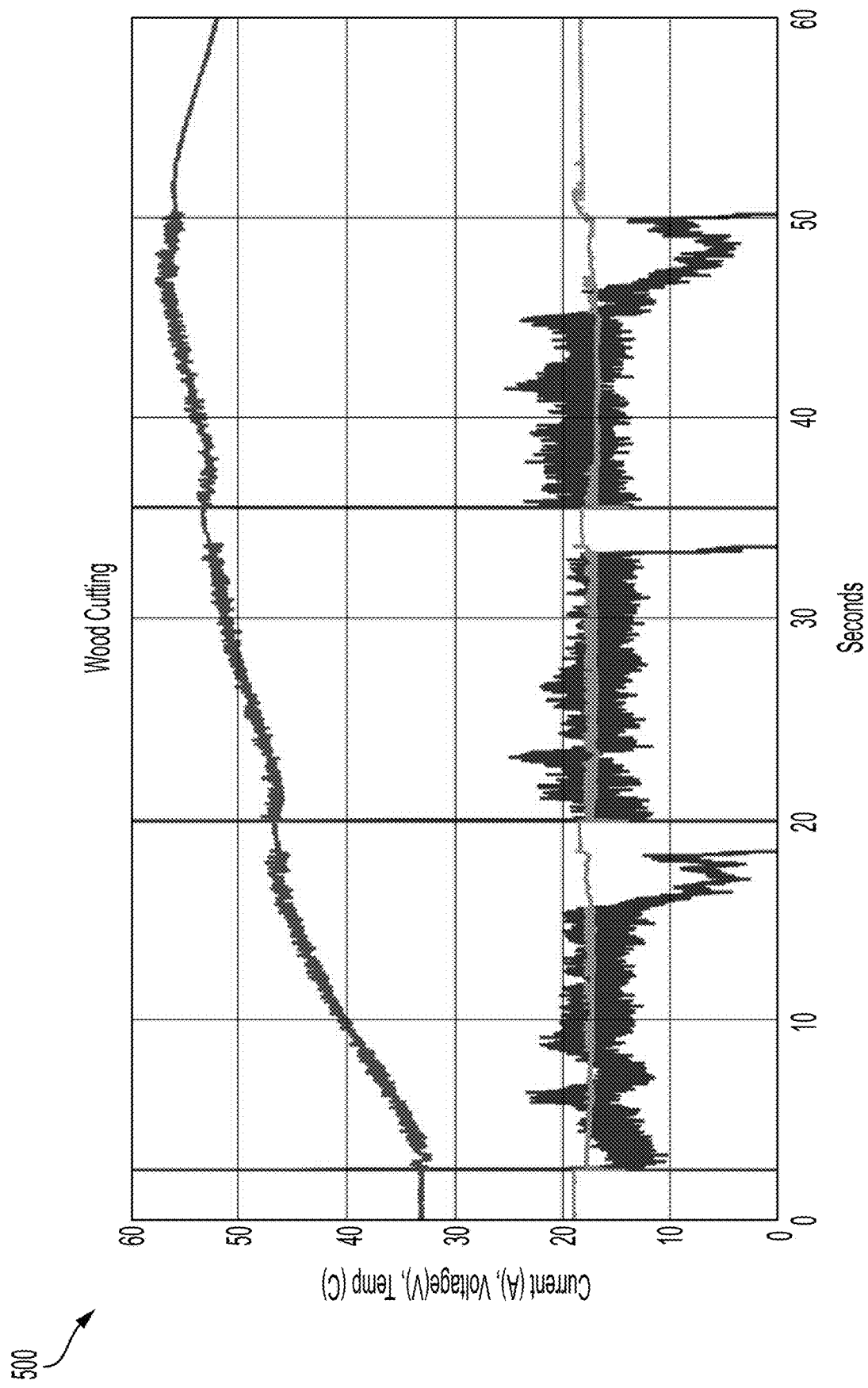
FIG. 10 is a graph generated by a user device of the power tool system of FIG. 1 based on the data logged by the data logger of FIG. 2 in accordance with some embodiments.

The user device 140 may use the data recorded by the data logger 130 to provide analytics to a user of the power tool system 100. In one example, the user device may generate a graph 500 as shown in FIG. 10 from the current, voltage, and temperature information recorded during a wood cutting operation performed by a reciprocating saw.

In some embodiment, the data logger 130 functionality described above may be implemented in other adapters that couple to the power tool 110 and/or battery pack 120. For example, the data logger 130 functionality may be implemented in adapters designed for location and inventory tracking of power tool devices, machine learning adapters, diagnosis, calibration, or warranty adapters, data readout or external display adapters, setting configuration adapters, extra sensor input adapters, monitoring adapters (for example, designed to monitor ambient temperature and/or humidity), and the like. In other embodiments, other adapter functionality may be implemented in the data logger 130 adapter described above. For example, location and inventory tracking of power tool devices, machine learning, diagnosis, calibration, warranty tracking, data readout, external display, setting configuration, extra sensor inputs, monitoring, and the like functionality may be implemented in the data logger 130 adapter.

In some embodiments, certain features of the data logger 130 described above may be implemented in power tool adapters, power tools 110, and battery packs 120. In one example, the locking mechanism 224 is provided on other power tool adapters (for example, tracking adapters and the like) to prevent accidental removal or theft of the power tool adapters. The lockout mechanism is also provided on battery packs 120 to prevent accidental removal and theft of the battery packs 120. In these embodiments, the power tool adapter and the battery pack 120 may include similar latching mechanisms (216, 220) as described above with respect to the data logger 130. The locking mechanism 224 is implemented similarly as described above to prevent the push buttons 220 from being actuated (i.e., pressed inwards).

In another example, the vibration screws 296 may similarly be provided on other power tool adapters and battery packs 120 to provide a vibration clamping feature to the power tool adapters and the battery packs 120. The vibration screws 296 are provided in the housing of the power tool adapters to provide compression between the power tool 110 and the power tool adapters that reduce the extra degree of freedom. Particularly, the compression provided by the vibration screws 296 dampens the vibrations caused due to the addition of the power tool adapters to the power tool system 100. The vibration screws 296 are also provided in the housing of the battery packs 120 to provide compression between the battery pack 120 and the power tool 110 or the battery pack 120 and the data logger 130/other power tool adapters. In some embodiments, rather than vibration screws 296 or in addition to vibration screws 296, other vibration dampening features, for example, overcenter cams, wedged rails, and the like may be used to dampen vibrations. In some embodiments, the vibration screws 286 may include metal inserts in plastic to support loadings and prevent stripping of the vibration screws 286.

In another example, the bus bar designs as illustrated in FIGS. 6-7C may also be implemented in power tools 110, battery packs 120, and other pass-through power tool adapters to minimize electrical resistance and increase thermal conductance. In power tools 110, battery packs 120, and power tool adapters, the main heat source may be at the terminals (for example, positive and negative power terminals of the power tools 110, battery packs 120, and power tool adapters). Bus bars including slots that engage the terminals help with increasing the surface area for increased thermal transfer. In some embodiments, the bus bars connected to the terminals may also include additional fins and slots to further increase the surface area.

Figure 11:
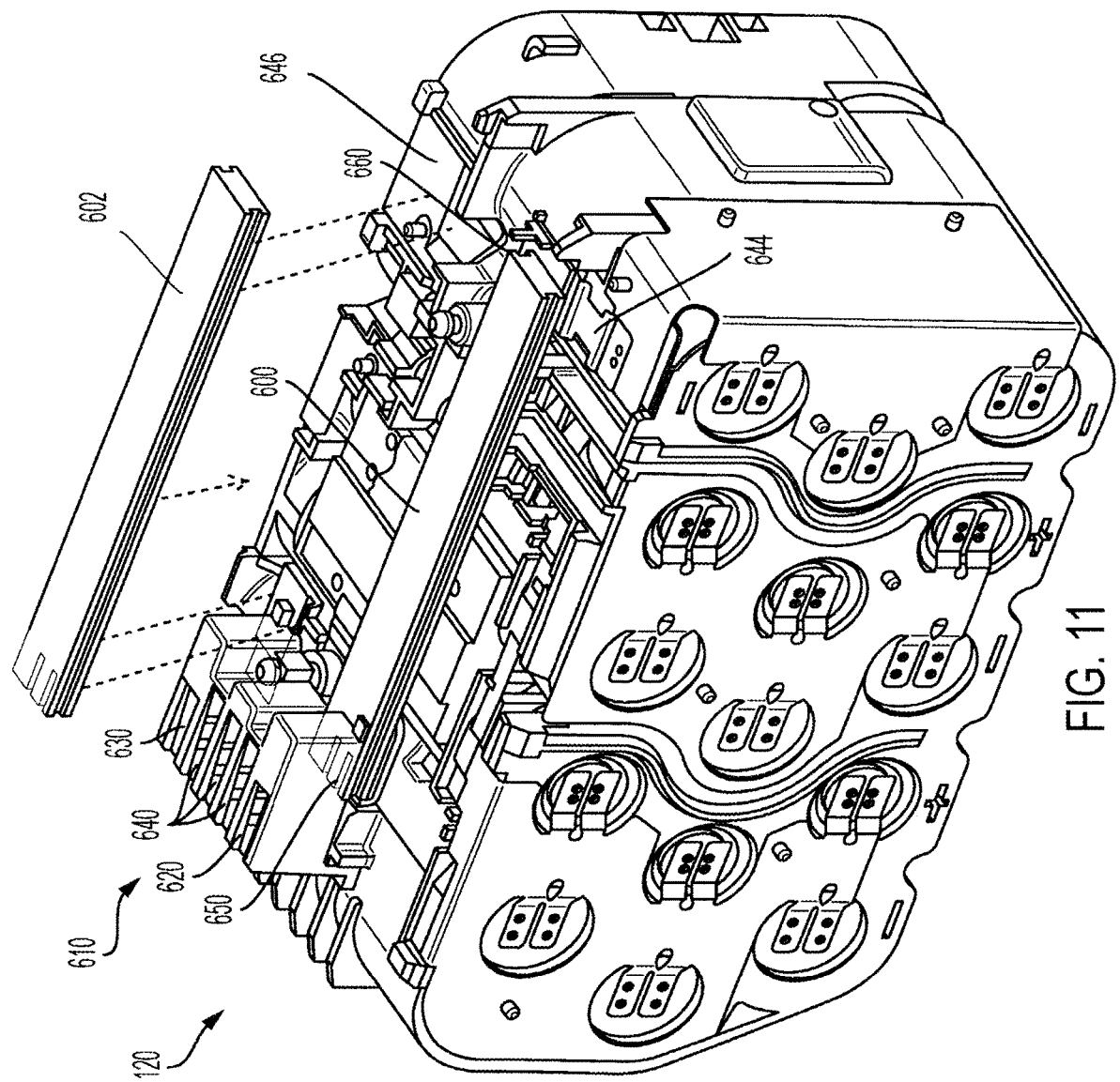
FIG. 11 illustrates a battery pack of the power tool data logging system 100 of FIG. 1 with a housing removed in accordance with some embodiments.

FIG. 11 illustrates the battery pack 120 including a bus bar 600 to improve the heat management features of the battery pack 120. The battery pack 120 can be connected directly to the power tool 110 or indirectly through the data logger 130 or other pass-through power tool adapters. The battery pack 120 includes battery terminals 610, which may include a positive power terminal 620, a negative power terminal 630, and one or more communication terminals 640. The bus bar 600 is coupled to the positive power terminal 620 or the negative power terminal 630. The bus bar 600 couples one of the positive power terminal 620 and the negative power terminal 630 to the positive or negative terminals of the battery cells respectively (see, for example, positive terminal 644 and negative terminal 646). In some embodiments, the battery pack 120 may include two bus bars (for example, the bus bar 600 and a bus bar 602) one each for the positive power terminal 620 (to connect to the positive terminal 644) and the negative power terminal 630 (to connect to the negative terminal 646) that may be designed similar to the bus bars 268, 272 respectively. The bus bar 602 is illustrated as elevated above the battery pack 120 for illustration, but is coupled to the negative power terminal 630 and negative terminal 646 when assembled, in a similar manner as the connection of the bus bar 600 with respect to the positive terminals.

In the example illustrated, the bus bar 600 defines slots 650 at a portion of the bus bar 600 that connects to the power terminals 620, 630. The bus bar 600 is designed in the shape of an I-bar having fins 660 (for example, a grooved fin) on either side of the bus bar 600 that extend through the length of the bus bar 600. The slots 650 in combination with the fins 660 increase the surface area for conduction, thereby reducing the electrical resistance and increasing the heat dissipation. The bus bar 600 is provided in addition to the illustrated connection plates (that may also be referred to as bus bars) that connect the battery cells of the battery pack 120. The illustrated battery pack 120 includes fifteen battery cells: with three sets of cells coupled in parallel, each set including five series-connected cells. Although the battery pack 120 is illustrated as having fifteen battery cells, in some embodiments, a different number of battery cells is provided, such as five cells, ten cells, twenty cells, or another number of cells.

Similar bus bars 600 can also be implemented in the power tool 110 and other power tool adapters to improve the heat dissipation properties of the power tool 110 and the power tool adapters. In addition, the bus bar 600 may include alternative heat dissipation features as illustrated in FIGS. 7A-7C.

Thus, embodiments described herein provide, among other things, a compact data logger for a power tool.

We claim:

1. A data logger for a power tool comprising:
    a housing;
    a power tool interface provided at the top of the housing and configured to be received in a corresponding interface of the power tool;
    a battery pack interface provided at the bottom of the housing and configured to receive a corresponding interface of a battery pack providing operating power to the power tool;
    a tool terminal block provided below the power tool interface;
    a battery terminal block provided above the battery pack interface;
    bus bars connecting the tool terminal block to the battery terminal block, wherein the data logger provides pass through power from the battery pack to the power tool via the bus bars for operation of the power tool when the data logger is coupled between the power tool and the battery pack;
    a transceiver for communication between the data logger and a user device;
    an electronic processor coupled to the transceiver and configured to
        obtain data related to power tool operation, and export, using the transceiver, the data to the user device;
push buttons provided on the housing and configured to release the data logger from the power tool when the push buttons are actuated; and
a locking mechanism provided on the housing, the locking mechanism including:
a front plate, and
a blocking post extending orthogonal to the front plate, the blocking post extending between the push buttons to prevent the push buttons from being actuated.

2. The data logger of claim 1, further comprising:
latches provided on either side of the power tool interface, wherein the latches engage corresponding projections on the corresponding interface of the power tool to prevent the data logger from sliding off the power tool when the data logger is coupled to the power tool,
wherein the push buttons are integrally connected to the latches inside the housing such that the latches move inward when the push buttons are actuated to release the data logger from the power tool.

3. The data logger of claim 1, wherein the front plate includes screw holes configured to receive fasteners that fix the locking mechanism onto the data logger.

4. The data logger of claim 1, wherein the tool terminal block includes
a positive power terminal that couples to a corresponding positive terminal of the power tool,
a negative power terminal that couples to a corresponding negative terminal of the power tool, and
one or more tool communication terminals that couple to corresponding one or more communication terminals of the power tool; and
wherein the battery terminal block includes
a positive battery power terminal that couples to a corresponding positive terminal of the battery pack,
a negative battery power terminal that couples to a corresponding negative terminal of the battery pack, and
one or more pack communication terminals that couple to corresponding one or more communication terminals of the battery pack.

5. The data logger of claim 4, wherein the bus bars include:
a positive bus bar electrically connecting the positive power terminal to the positive battery power terminal; and
a negative bus bar electrically connecting the negative power terminal to the negative battery power terminal.

6. The data logger of claim 5, wherein one or more of the positive bus bar and the negative bus bar include fins and slots to extend a surface area for heat dissipation.

7. The data logger of claim 5, wherein the negative bus bar extends linearly from the negative battery power terminal to the negative power terminal and wherein the positive bus bar is c-shaped and includes a loop that extends toward the rear of the data logger, the data logger further comprising:
a current sensor provided on the loop of the positive bus bar and configured to detect an amount of current flowing between the power tool and the battery pack, wherein obtaining data related to power tool operation includes detecting the amount of current flowing between the power tool and the battery pack.

8. The data logger of claim 1, further comprising vibration screws providing compression between the power tool and the data logger and dampening vibrations caused by addition of data logger to a power tool system including the power tool and the battery pack, wherein the vibration screws extend diagonally through the housing at a rear portion of the housing and wherein the vibration screws extend through openings in the housing and contact the corresponding interface of the power tool.

9. The data logger of claim 1, further comprising:
a main printed circuit board (PCB) hosting the electronic processor; and
a daughter printed circuit board (PCB) provided on top of the main PCB in a stacked configuration and hosting the transceiver and a global positioning system (GPS) chip, wherein the electronic processor is further configured to:
synchronize, using the GPS chip, an internal clock of the data logger; and
determine, using the GPS chip, a real-time location of the data logger, wherein obtaining data related to power tool operation includes determining the real-time location of the data logger when the data logger is coupled to the power tool.

10. The data logger of claim 1, further comprising:
a temperature sensor configured to detect a temperature of one or more selected from the power tool and the battery pack, wherein obtaining data related to power tool operation includes detecting the temperature of one or more selected from the power tool and the battery pack; and
a motion sensor configured to detect movement and orientation of the power tool,
wherein obtaining data related to power tool operation includes detecting the movement and orientation of the power tool.

11. A method for logging data using a data logger comprising:
coupling a power tool interface of the data logger to a corresponding interface of a power tool, wherein a tool terminal block is provided below the power tool interface;
coupling a battery pack interface of data logger to a corresponding interface of a battery pack, wherein a battery terminal block is provided below the battery pack interface;
providing, using bus bars electrically connecting the tool terminal block to the battery terminal block, power from the battery pack to the power tool for operation of the power tool when the data logger is coupled between the power tool and the battery pack;
obtaining, using an electronic processor of the data logger, data related to power tool operation;
exporting, using the electronic processor and a transceiver of the data logger, the data related to power tool operation to the user device;
preventing, with a locking mechanism, the data logger from being released from the power tool, the locking mechanism including a blocking post extending between push buttons provided on the data logger to prevent the push buttons from being actuated.

12. The method of claim 11, further comprising:
hosting, on a main printed circuit board (PCB) in the housing of the data logger, the electronic processor;
hosting, on a daughter printed circuit board (PCB) provided on top of the main PCB in a stacked configuration, the transceiver an a global positioning system (GPS) chip;
synchronizing, using the GPS chip, an internal clock of the data logger; and determining, using the GPS chip, a real-time location of the data logger, wherein obtaining data related to power tool operation includes determining the real-time location of the data logger when the data logger is coupled to the power tool.

13. The method of claim 11, wherein obtaining the data related to power tool operation includes one or more selected from a group consisting of:
- detecting, using a current sensor of the data logger, an amount of current flowing between the power tool and the battery pack,
- detecting, using a temperature sensor, a temperature of one or more selected from the power tool and the battery pack, and
- detecting, using a motion sensor, movement and orientation of the power tool.

\* \* \* \* \*